US010739282B2

(12) United States Patent
Chen et al.

(10) Patent No.: US 10,739,282 B2
(45) Date of Patent: Aug. 11, 2020

(54) LEAD CURTAIN PROTECTIVE DEVICE FOR DETECTING DEVICE AND RAY SHIELDING METHOD

(71) Applicant: Nuctech Company Limited, Beijing (CN)

(72) Inventors: Zhiqiang Chen, Beijing (CN); Li Zhang, Beijing (CN); Mingzhi Hong, Beijing (CN); Yong Zhou, Beijing (CN); Yihong Liu, Beijing (CN)

(73) Assignee: Nuctech Company Limited, Beijing (CN)

( * ) Notice: Subject to any disclaimer, the term of this patent is extended or adjusted under 35 U.S.C. 154(b) by 129 days.

(21) Appl. No.: 16/168,850

(22) Filed: Oct. 24, 2018

(65) Prior Publication Data

US 2019/0064082 A1 Feb. 28, 2019

Related U.S. Application Data

(63) Continuation of application No. PCT/CN2017/073207, filed on Feb. 10, 2017.

(30) Foreign Application Priority Data

Aug. 18, 2016 (CN) .......................... 2016 1 0685574

(51) Int. Cl.
*G01N 23/10* (2018.01)
*G01V 5/00* (2006.01)

(52) U.S. Cl.
CPC ........... *G01N 23/10* (2013.01); *G01V 5/0008* (2013.01); *G01V 5/0016* (2013.01)

(58) Field of Classification Search
CPC ..... G01N 23/10; G01V 5/0008; G01V 5/0016
See application file for complete search history.

(56) References Cited

U.S. PATENT DOCUMENTS 6,304,629 B1 10/2001 Conway et al.
7,817,775 B2 10/2010 Kang et al.
(Continued)

FOREIGN PATENT DOCUMENTS

CN 101726500 A 6/2010
CN 103175855 A 6/2013
(Continued)

OTHER PUBLICATIONS

"Russian Federation Application Serial No. 2018139558/28(065690), Decision to Grant a Patent for Invention dated Jul. 29, 2018", 20 pgs.

(Continued)

*Primary Examiner* — Chih-Cheng Kao
(74) *Attorney, Agent, or Firm* — Schwegman Lundberg & Woessner, P.A.

(57) ABSTRACT

A device comprises: at least two lead curtains; a supporting assembly comprising a working area and a standby area; a first transmission assembly to drive the lead curtains to move in a conveying channel; and a second transmission assembly to transfer the lead curtains between the standby area and the working area, wherein the second transmission assembly transfers the lead curtains from the standby area to the working area, so that the lead curtains fall into a starting point of the conveying channel and are located behind an article to be detected; the first transmission assembly drives the lead curtains to move with the article to be detected in front and drive the lead curtains to move from the starting point of the working area to a starting point of the standby area; and the second transmission assembly drives the lead curtains to enter and move in the standby area.

20 Claims, 7 Drawing Sheets

1
15
14
13
17'
17
18
18'
12
102
101
11
10
16

(56) References Cited

U.S. PATENT DOCUMENTS

| | | | | |
|---|---|---|---|---|
| 2005/0185757 | A1 | 8/2005 | Kresse et al. | |
| 2013/0224071 | A1 | 8/2013 | Bernstein | |
| 2016/0372223 | A1 * | 12/2016 | Splinter | G01V 5/0016 |

FOREIGN PATENT DOCUMENTS

| | | | | |
|---|---|---|---|---|
| CN | 204028022 | U | 12/2014 | |
| CN | 204331058 | U | 5/2015 | |
| CN | 204436228 | U | 7/2015 | |
| CN | 106066337 | A | 11/2016 | |
| CN | 206038573 | U | 3/2017 | |
| EP | 1141683 | A2 | 10/2001 | |
| GB | 2113828 | A | 8/1983 | |
| RU | 2373526 | C2 | 11/2009 | |
| RU | 119489 | U1 | 8/2012 | |
| RU | 157515 | U1 | 12/2015 | |
| WO | 2011114335 | A1 | 9/2011 | |
| WO | WO-2015114411 | A1 * | 8/2015 | G01N 23/04 |

OTHER PUBLICATIONS

Yang Xueliang et al., Lead protective curtain of X-ray machine that can be automatically lifted, Full text < Chinese Medical Equipment Journal> Issue 1, Dec. 31, 1993.

"European Application No. 17840711.0, Supplementary Partial European Search Report dated Mar. 23, 2020", 11 pgs.

* cited by examiner

LEAD CURTAIN PROTECTIVE DEVICE FOR DETECTING DEVICE AND RAY SHIELDING METHOD

CROSS-REFERENCE TO RELATED APPLICATIONS

This application is a continuation of PCT Patent Application Serial No. PCT/CN2017/073207 entitled "LEAD CURTAIN PROTECTIVE DEVICE FOR DETECTING DEVICE AND RAY SHIELDING METHOD" filed on Feb. 10, 2017, which in turn claims priority of Chinese Patent Application No. 201610685574.6 filed on Aug. 18, 2016, the disclosures of which are each incorporated by reference in their entireties.

TECHNICAL FIELD

The present disclosure relates to the technical field of security detection device, and in particular to a lead curtain protective device for a detecting device and a ray shielding method.

BACKGROUND

Security inspection systems are widely used in stations, subways, airports, customs, ports, nuclear power stations, government offices, postal inspection centers, courts, meeting places and the like since they have small sizes, light weights, low power consumption and improved self-diagnosis functions and thus can be conveniently operated and maintained.

Since X-rays generated by security inspection machine in operation will affect the health of operators, lead curtains are usually installed at both ends of a housing of the security inspection machine to serve as shielding curtains to shield the X-rays in security inspection channels and prevent the X-rays from spreading out to cause potential damage to surrounding people.

Currently, lead curtains mainly comprise fixed lead curtains and movable lead curtains. As a typical example, the movable lead curtain is in a roller-rotation form. Generally, existing lead curtains are fixedly suspended at entrances and exits of the security inspection channels. In a general security inspection process, an article to be detected is conveyed by a conveyor belt to push a lead curtain at the entrance to enter a detection zone, and after being detected, the article is conveyed by the conveyor belt to push a lead curtain at the exit to leave the detection zone.

In practical application of fixed lead curtains, since the lead curtain is relatively heavy, some lightweight articles to be detected cannot push the lead curtain to enter the detection zone, which brings unnecessary troubles. Furthermore, when the lead curtains are pushed open, the X-rays will inevitably spread out.

For a lead curtain device in the roller-rotation form, intervals between adjacent lead curtains are fixed and cannot be adjusted. In one way, the arrangement of the articles to be detected shall adapt to the fixed intervals between the lead curtains. Accordingly, the articles to be detected should be deliberately placed to adapt to the fixed intervals between the lead curtains, which results in low detection efficiency and time waste. In another way, the lead curtains shall be densely arranged along the conveyor belt, instead of deliberately arranging the articles to be detected to adapt to the fixed intervals between the lead curtains. However, this way results in that the entire transmission system is very heavy, thereby causing great energy waste. Moreover, it cannot be guaranteed that a lead curtain in the entire channel is precisely located in the space between the articles to be detected, and in this case, the rays will spread out.

Furthermore, the transmission of the roller-type conveyor belts has obvious disadvantages. That is, in practical application, the lead curtains cannot be easily and effectively fixed on the conveyor belts. The current customized conveyor belts have no interface to connect with external devices and need to be retrofitted, so that the high cost will make mass production unfeasible. Besides, in the practical application, if the intervals between the rollers are too large, when the lead curtains are densely distributed, the weights of the lead curtains will inevitably cause a serious downward deflection of the conveyor belts, resulting in greatly reduced article transfer and X-ray shielding effects.

Therefore, there is needed an improved ray shielding method for detecting device and a lead curtain protective device.

SUMMARY

In order to effectively solve one or more of aforementioned problems in the prior art, the present disclosure provides a lead curtain protective device for detecting device and a ray shielding method, which can achieve one or more of the following objects: adaptively adjusting the intervals between lead curtains according to the moving conditions of articles to be detected on a belt conveyor, shielding rays in the conveying channel, improving the ray shielding effect in the conveying channel and improving the safety of the detection device.

To achieve the above objects, the present disclosure provides the following technical solutions.

According to one aspect of the present disclosure, there is provided a lead curtain protective device for detecting device, comprising: at least two lead curtains, for shielding rays in a conveying channel; a supporting assembly, comprising a working area and a standby area, wherein the conveying channel is accommodated in the working area, and the standby area is adapted to store the lead curtains that are not used in the working area; a first transmission assembly, for driving the lead curtains to move in the conveying channel; and a second transmission assembly, for transferring the lead curtains between the standby area and the working area, wherein the second transmission assembly is adapted to transfer the lead curtains from the standby area to the working area, so that the lead curtains fall into a starting point of the conveying channel and are located behind an article to be detected; the first transmission assembly is adapted to drive the lead curtains falling into the conveying channel to synchronously move with the article to be detected in front and drive the lead curtains to move from the starting point of the working area to a starting point of the standby area; and the second transmission assembly is further adapted to drive the lead curtains to enter the standby area and move in the standby area, when the lead curtains arrive at the starting point of the standby area.

According to one aspect of the present disclosure, the lead curtain protective device further comprises a guide assembly arranged on the supporting assembly, wherein the guide assembly is adapted to guide motion trajectories of the lead curtains in the working area and the standby area.

According to one aspect of the present disclosure, the first transmission assembly comprises a first conveyor belt, first stops are arranged on the first conveyor belt along a circumference of the first conveyor belt, and the first conveyor belt is adapted to drive the lead curtains to move through the first stops.

According to one aspect of the present disclosure, the first transmission assembly further comprises a first driving unit for continuously driving the first conveyor belt to rotate at a constant speed.

According to one aspect of the present disclosure, the second transmission assembly comprises a second conveyor belt, second stops are arranged on the second conveyor belt along a circumference of the second conveyor belt, the number of the second stops corresponds to the number of the lead curtains that can be stored in the standby area, and the second conveyor belt is adapted to drive, through the second stops, the lead curtains to enter or leave the standby area or drive the lead curtains to move in the standby area.

According to one aspect of the present disclosure, the second transmission assembly further comprises a second driving unit for intermittently driving the second conveyor belt to rotate, and wherein when the second driving unit drives the second conveyor belt to rotate once, each second stop moves forward by an interval between any two adjacent stops.

According to one aspect of the present disclosure, the second driving unit is adapted to drive the second conveyor belt to rotate once in one of the following cases: the article to be detected completely enters the conveying channel; any of the lead curtains arrives at an ending point of the conveying channel and is about to enter the standby area from the working area; and only one lead curtain is located in the conveying channel, and has arrived at the ending point of the conveying channel.

According to one aspect of the present disclosure, the lead curtain protective device further comprises detecting assemblies, wherein the detecting assemblies comprise a first detecting assembly for detecting a relative position of the article to be detected and the conveying channel, and a second detecting assembly for detecting moving states and distribution conditions of the lead curtains.

According to another aspect of the present disclosure, there is provided a ray shielding method, comprising: transferring a lead curtain from a standby area to a working area, so that the lead curtain fall into a starting point of a conveying channel and is located behind an article to be detected; driving the lead curtain falling into the conveying channel to synchronously move with the article to be detected in front, and driving the lead curtain to move from the starting point of the conveying channel to a starting point of the standby area; and transferring the lead curtain arriving at the starting point of the standby area into the standby area, and driving the lead curtain to move in the standby area.

According to another aspect of the present disclosure, the ray shielding method further comprises: detecting a relative position of the article to be detected and the conveying channel to control a time of transferring the lead curtain between the standby area and the working area.

According to another aspect of the present disclosure, the lead curtain in the standby area is transferred to the working area in at least one of the following cases: the article to be detected completely enters the conveying channel; and only one lead curtain is located in the conveying channel, and has arrived at the ending point of the conveying channel.

According to another aspect of the present disclosure, the transferring of the lead curtain in the standby area to the working area is stopped in at least one of the following cases: the number of the lead curtains in the conveying channel is greater than 2; and a time from transferring a previous lead curtain from the standby area to the working area is less than a preset time interval.

According to another aspect of the present disclosure, whenever one lead curtain is transferred from the standby area to the working area, a lead curtain behind the lead curtain in the standby area moves forward by a distance.

According to another aspect of the present disclosure, after the lead curtain in the standby area and close to the working area is moved once but cannot be transferred to the working area, the lead curtain can be moved forward for multiple times so as to be transferred to the working area.

BRIEF DESCRIPTION OF THE DRAWINGS

The features, advantages and technical effects of exemplary embodiments of the present disclosure will be described below with reference to accompany drawings.

DETAILED DESCRIPTION

Figure 1:
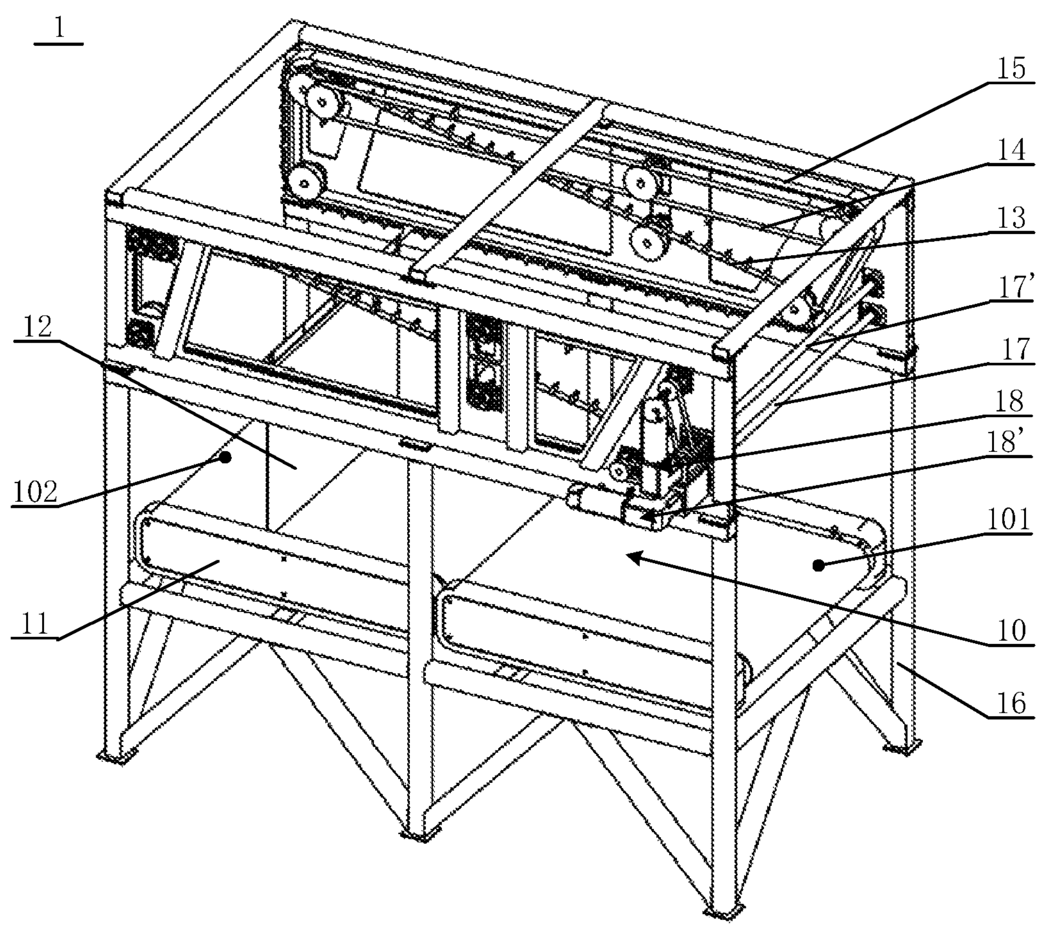
FIG. 1 shows a schematic diagram of an overall structure of a lead curtain protective device for a detecting device according to an embodiment of the present disclosure.

The features and exemplary embodiments of various aspects of the present disclosure will be described below in detail. In the following detailed description, numerous specific details are set forth in order to provide a thorough understanding of the present disclosure. It will be apparent, however, to those skilled in the art, that the present disclosure can be implemented without some of these specific details. The following description of the embodiments is provided merely for the purpose of providing a better understanding of the present disclosure by showing examples of the present disclosure. The present disclosure is in no way limited to any particular configuration set forth below, and it is intended to cover any modifications, substitutions and improvements of elements and components without departing from the spirit of the present disclosure. In the drawings and the following description, well-known structures and techniques are not shown in order to avoid unnecessarily obscuring the present disclosure.

To better understand the present disclosure, a detailed description of a lead curtain protective device 1 according to an embodiment of the present disclosure will be given below with reference to FIG. 1 to FIG. 9.

Figure 2:
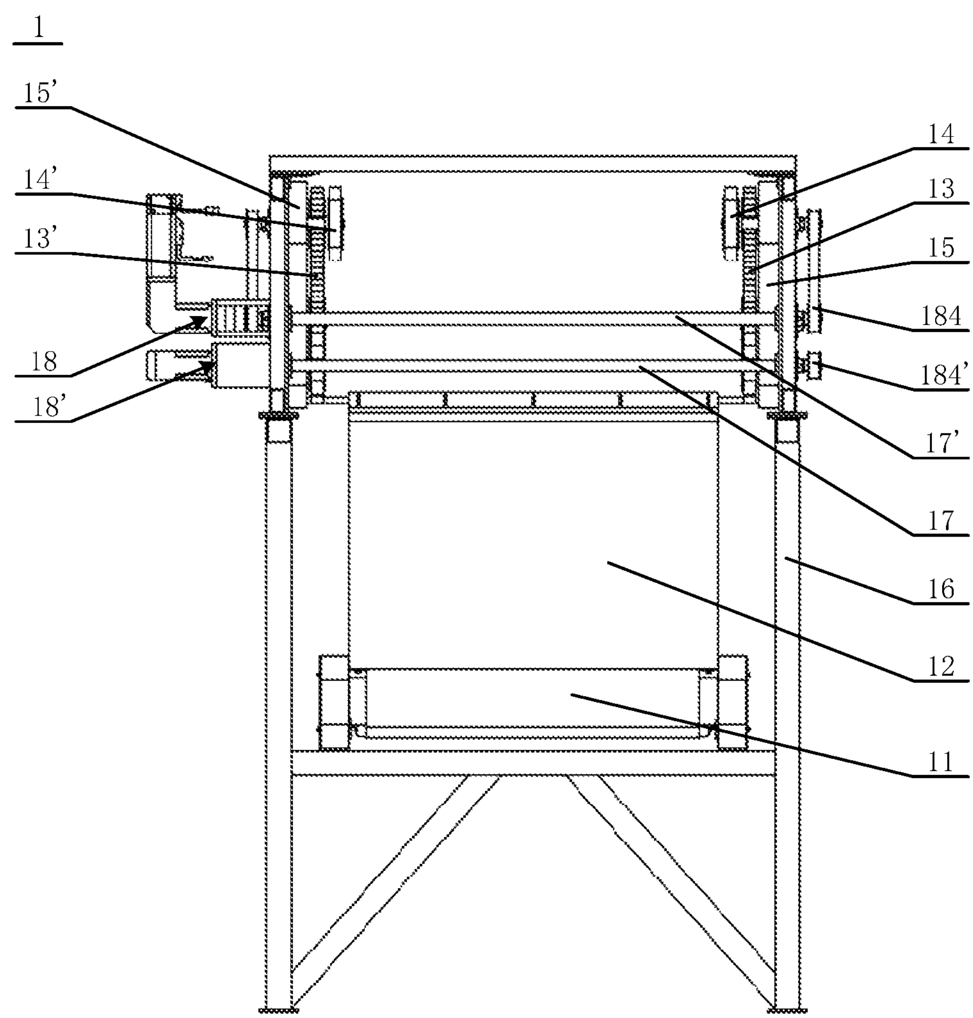
FIG. 2 shows a right view of a lead curtain protective device according to an embodiment of the present disclosure.
Figure 3:
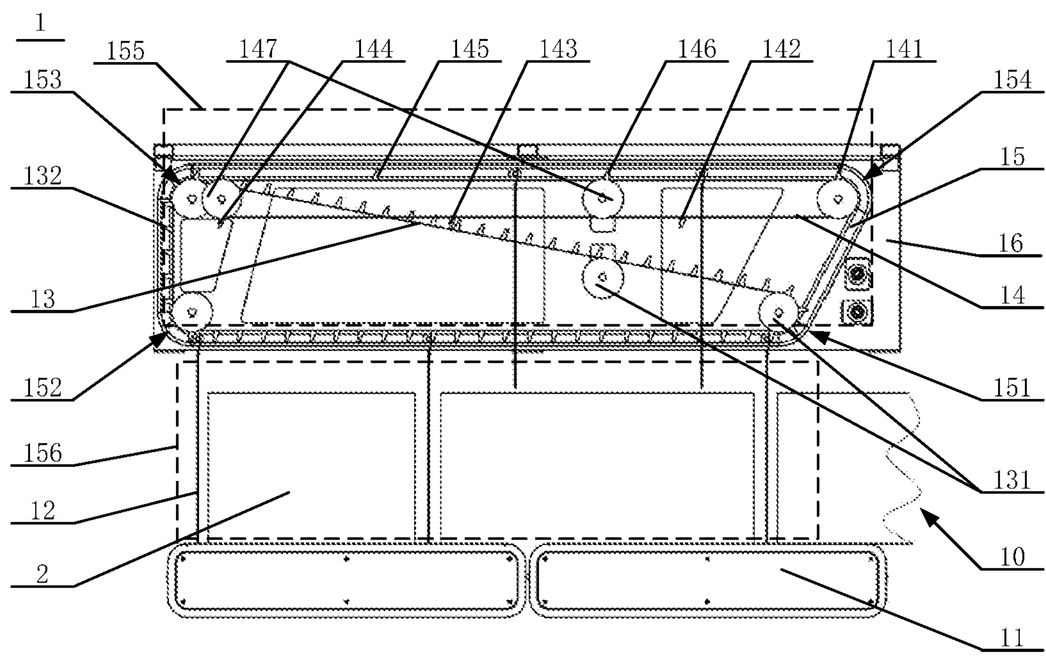
FIG. 3 shows a sectional view of a lead curtain protective device along a longitudinal direction according to an embodiment of the present disclosure.

FIG. 1 is a schematic diagram of an overall structure of the lead curtain protective device 1 for a detecting device (referred to as lead curtain protective device below) according to an embodiment of the present disclosure, FIG. 2 is a right view of the lead curtain protective device 1 according to the embodiment of the present disclosure, and FIG. 3 is a sectional view of the lead curtain protective device 1 along a longitudinal direction according to the embodiment of the present disclosure. As shown in the figures, the lead curtain protective device 1 is mounted in a security detecting device and comprises lead curtains 12, a first transmission assembly, a second transmission assembly and a supporting assembly 16. Specifically, the supporting assembly 16 comprises a working area and a standby area, and a conveying channel 10 is accommodated in the working area. There are at least two 2 lead curtains 12, which are adapted to shield rays in the conveying channel 10 to prevent the rays from spreading out. The lead curtains 12 that are not used in the working area are stored in the standby area. The first transmission assembly is adapted to drive the lead curtains 12 to move from a starting point of the working area to a starting point of the standby area. When the lead curtains 12 arrive at the starting point of the standby area, the second transmission assembly will drive the lead curtains 12 to enter the standby area and move in the standby area. Specifically, the second transmission assembly transfers the lead curtains 12 from the standby area to the working area, so that the lead curtains fall into the starting point of the conveying channel 10 and are located behind an article to be detected so as to prevent the rays behind each article to be detected (an article being detected that does not completely enter the conveying channel can be referred to as the article to be detected) from spreading out. The first transmission assembly drives the lead curtains 12 falling into the conveying channel 10 to synchronously move with the article to be detected in front such that the lead curtains 12 are moved from the starting point of the conveying channel 10 to an ending point of the conveying channel 10, and further conveys the lead curtains 12 to the starting point of the standby area. A position at which the article to be detected 2 enters the conveying channel 10 is set as a starting point 101 according to a conveying direction of the article to be detected 2, and a position at which the article leaves the conveying channel 10 is set as an ending point 102. When the lead curtains 12 arrive at the ending point 102 of the conveying channel 10, the lead curtains are further conveyed to the starting point of the standby area and are transferred by the second transmission assembly from the working area to the standby area to fall into a standby state. The device can adaptively adjust distances between of the respective lead curtains 12 according to the distribution condition of the articles to be detected moving on a belt conveyor 11, so that the lead curtains 12 can be located in the gaps between the articles to be detected so as to effectively prevent the rays in the conveying channel 10 from spreading out and guarantee the personal safety of people around.

In the embodiment of the present disclosure, the supporting assembly 16 is adapted to fix various components and providing support for the overall structure. The supporting assembly 16 can be for example a frame structure as illustrated, and can be made of a metal or non-metallic material. Components of the corresponding lead curtain protective device 1 are provided with corresponding mounting parts, so that the components can be arranged rationally. In the embodiment as shown in FIG. 3, an area defined by the standby area 155 and the working area 156 is shown in detail. As shown in the figure, the belt conveyor 11 is fixed at a longitudinal height position at a middle-lower part of the supporting assembly 16. Five planes of the supporting assembly 16 and a transport plane of the belt conveyor 11 enclose and form a plurality of areas. The working area 156 is a lower area, which is specifically enclosed by two side faces of the supporting assembly 16 and a transport plane of the belt conveyor 11 between the two side faces. The standby area 155 is an upper area, which is specifically enclosed by two side faces and an upper top face of the supporting assembly 16. A plane of the first transmission assembly which is parallel to two conveying segments of the belt conveyor 11 serves as an interface to separate the working area 156 from the standby area 155. The conveying channel 10 is located in the working area 156, which is specifically enclosed by the transport plane of the belt conveyor 11, the two side faces of the supporting assembly 16 and the lead curtain 12 located at the starting point 101, and extends in the same direction as the transport plane of the belt conveyor 11.

The belt conveyor 11 drives the article to be detected to move in the conveying channel 10, such that the article to be detected can be conveyed from the starting point 101 of the conveying channel 10 to the ending point 102. According to the actual conveying condition of the articles to be detected, the positions of the starting point 101 and the ending point 102 can be adaptively adjusted. Furthermore, the fixed position of the belt conveyor 11 in the supporting assembly 16 is not limited to the above, as long as the conveying of the article to be detected in the conveying channel 10 can be completed. In other embodiments, the belt conveyor 11 can also be fixed at any longitudinal height position at the supporting assembly 16 according to the actual mounting demand of the security detecting device, and at this time, the position of the conveying channel 10 is accordingly changed according to the position of the transport plane of the belt conveyor 11.

In the embodiment of the present disclosure, two guide assemblies 15 and 15' are symmetrically mounted on two respective sides of the supporting assembly 16 for guiding the motion trajectories of the lead curtains 12. Specifically, the guide assemblies 15 and 15' restrict and constrain the motion trajectories of the lead curtains 12 in the working area and the standby area. The guide assemblies 15 and 15' are annular guide rails that can be made of a rigid material to increase the supporting force for the lead curtains 12. The guide assemblies 15 and 15' are respectively composed of two sleeved annular frames and annular slots formed between the annular frames, and connection parts of the lead curtains 12 are arranged in the annular slots of the guide assemblies 15 and 15' to circularly move therein. The connection parts of the lead curtains 12 are supporting shafts, and both ends of the supporting shaft can directly contact with and slide in the annular slots of the guide assemblies 15 and 15', or can roll along the annular slots of the guide assemblies 15 and 15' by providing rolling bearings, so that the connection parts of the lead curtains can be driven by the first transmission assembly or the second transmission assembly to circularly move in the annular slots.

The lateral lengths of the guide assemblies 15 and 15' are large enough to allow the lead curtains 12 to move from the starting point 101 to the ending point 102 of the conveying channel 10. Therefore, each lead curtain 12 has two travels in the lead curtain protective device 1: an upper travel and a lower travel. When the lead curtain 12 is in the upper travel (i.e. located in the standby area) (it specifically indicates that its connection part is located in an upper part of the annular slots of the guide assemblies 15 and 15'), the lead curtain can be driven by the second transmission assembly to move, a bottom edge of the lead curtain 12 is away from the transport plane of the belt conveyor 11, and the lead curtain 12 is in a standby state. When the lead curtain 12 is in the lower travel (i.e., located in the working area) (it specifically indicates that its connection part is located in a lower part of the annular slots of the guide assemblies 15 and 15'), the lead curtain can be driven by the first transmission assembly to move, and the bottom edge of the lead curtain 12 is close to the transport plane of the belt conveyor 11, thus the lead curtain keeps behind the article to be detected 2 so as to prevent the rays in the conveying channel from spreading out.

In the working area 156, the lead curtain 12 is in a working state. When the lead curtain 12 is at the starting point 101, the connection part of the lead curtain 12 for connecting with the guide assemblies 15 and 15' is accordingly located at a first position 151 of the guide assemblies 15 and 15' (only the position of one side of the lead curtain on the guide assemblies is exemplarily illustrated, and the other side is symmetrically arranged; and it is hereinafter referred to as that the lead curtain is at the first position 151 and the description of other positions is the same as that of the first position 151). When the lead curtain 12 moves to the ending point 102, the connection part of the lead curtain is accordingly at a second position 152 of the guide assemblies 15 and 15'. When the lead curtain 12 is about to be transferred from the working area 156 to the standby area 155, its connection part is accordingly at a third position 153 of the guide assemblies 15 and 15'. When the lead curtain 12 is about to be transferred from the standby area 155 to the working area 156, its connection part is accordingly at a fourth position 154 of the guide assemblies 15 and 15', and the lead curtain 12 serves as the next lead curtain 12 that is ready to be moved to the starting point 101. Due to the arrangement of the guide assemblies 15 and 15', the lead curtains 12 can be effectively supported to prevent a downward deflection of the annular guide rails resulted from a large number of the lead curtains 12, which will affect the protection effect.

FIG. 1 to FIG. 9 exemplarily show a case in which the lead curtain protective device 1 has 2-5 lead curtains 12. In other embodiments, more lead curtains 12 can also be provided. The number of the lead curtains 12 in the lead curtain protective device 1 can also be adaptively adjusted according to a detection frequency for the articles to be detected, the number of the articles to be detected and other actual conditions, so that the number of the lead curtains 12 can be sufficient to meet the ray shielding demand in the conveying channel 10.

Furthermore, the number and structures of the guide assemblies are not limited to the above. Other structures in the security detecting device can also serve as the guide assemblies, as long as they can constrain and guide the motion trajectories of the lead curtains 12, and the lead curtains 12 have the two travels mentioned above. For example, in other embodiments, the number of the guide assemblies can also be three. In this case, the guide assemblies on the respective sides are still mounted in the same manner as in the aforementioned embodiment. A third guide assembly is mounted on the supporting assembly 16 in such a manner that: the third guide assembly is located in the middle of the two guide assemblies on the respective sides or at a position more closer to one of the two guide assemblies, in order to share the supporting force with the guide assemblies on the respective sides. Therefore, the guide assemblies can be stressed more uniformly, and the service life of the lead curtain protective device is prolonged. Furthermore, the guide assemblies can also be arranged in a form similar to complete conveyor belts, so that the connection parts of the lead curtains can be mounted in the guide assemblies in a plane contact manner, and thus the guide assemblies can be stressed more uniformly.

Figure 4:
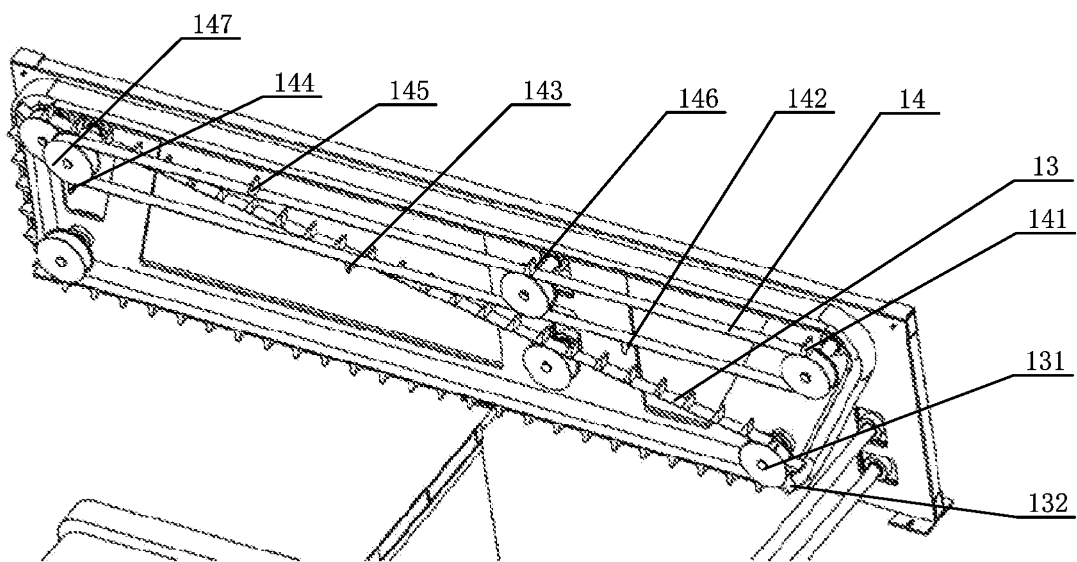
FIG. 4 shows an enlarged schematic diagram of a first transmission assembly and a second transmission assembly according to an embodiment of the present disclosure.

According to the embodiment of the present disclosure, the first transmission assembly for driving the lead curtains 12 to move in the working area 156 comprises first conveyor belts 13 and 13'. FIG. 4 shows an enlarged schematic diagram of the first transmission assembly and the second transmission assembly according to the embodiment of the present disclosure. The first conveyor belts 13 and 13' are respectively provided with a plurality of first stops 132 along their respective circumferences to drive the lead curtains 12 to synchronously move by the first stops 132. The first stops 132 can be a plurality of projections that are uniformly or non-uniformly formed on the first conveyor belts 13 and 13'. The density of the first stops 132 is related to the number of the lead curtains 12 as appropriate. However, in the embodiment of the present disclosure, the number of the first stops 132 shall not affect the driving of the lead curtains 12 by the first conveyor belts 13 and 13'. The first conveyor belts 13 and 13' are symmetrically arranged on the respective sides of the supporting assembly 16 through four drive wheels 131 respectively. The first conveyor belts 13 and 13' are configured to have polygonal structures due to the arrangement of the drive wheels 131. Exemplarily, a triangular arrangement is shown in the figure, wherein the first conveyor belts 13 and 13' form an angular structure at the first position 151 by one of the drive wheels 131, and the first conveyor belts form a transition edge between the second position 152 and the third position 153 by the other two drive wheels 131 such that the lead curtains 12 can be conveyed from the ending point 102 of the conveying channel 10 to the starting point of the standby area 155 along the transition edge, and the rest drive wheel 131 plays a tensioning role to allow the first conveyor belts 13 and 13' to drive the lead curtains 12 to move in the working area and transfer the lead curtains 12 from the second position 152 to the third position 153, in order to complete the entire lower travel.

Figure 5:
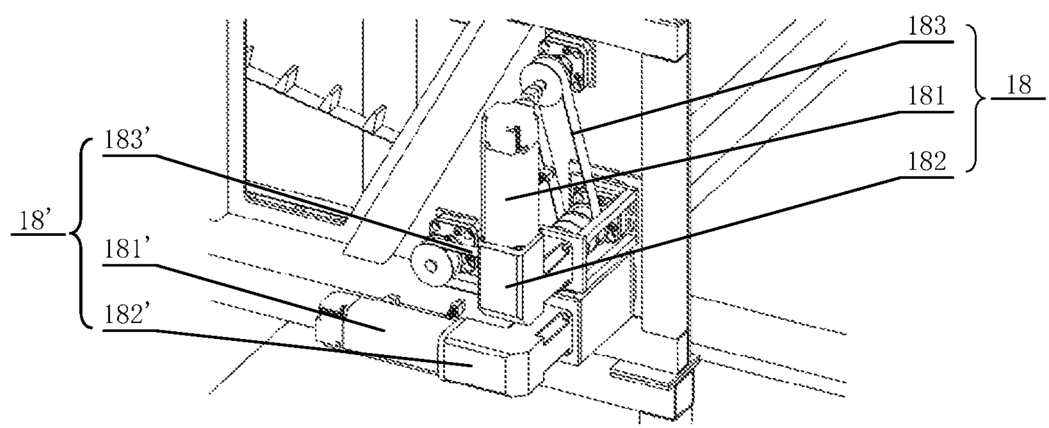
FIG. 5 shows an enlarged schematic diagram of a first driving unit and a second driving unit according to an embodiment of the present disclosure.

In order that the first conveyor belts 13 and 13' on the respective sides of the supporting assembly 16 form a first transmission assembly that can drive the lead curtains 12 thereon to complete the lower travel in the conveying channel 10, the lead curtain protective device 1 further comprises a first driving unit 18' for continuously driving the first conveyor belts 13 and 13' to rotate at a constant speed. FIG. 5 shows an enlarged schematic diagram of the first driving unit 18' and a second driving unit 18 according to the embodiment of the present disclosure. The first driving unit 18' comprises a motor 181', a speed reducer 182' and synchronous belts 183' and 184', which are connected in the above sequence (as shown in FIG. 2). The first conveyor belt 13' transfers a driving force to the first conveyor belt 13 by a transmission shaft 17 (as shown in FIG. 1) and the synchronous belt 184', wherein the transmission shaft 17 is connected with a pair of oppositely arranged drive wheels 131. Moreover, the moving speed of the first conveyor belts 13 and 13' is synchronous to the moving speed of the belt conveyor 11, so that the lead curtains 12 can keep the same moving speed as the article to be detected and are located behind the article to be detected. Therefore, it is guaranteed that when the article to be detected is located in the conveying channel 10, the first driving unit 18' drives the first conveyor belts 13 and 13' which then drive the first stops 132 to synchronously move with the article to be detected 2. Moreover, the moving of the article to be detected 2 will not be affected, and the rays in the conveying channel 10 can be effectively prevented from spreading out.

Furthermore, the above-mentioned driving unit is not limited to the above, as long as it can drive the first conveyor belts 13 and 13' to circularly move at a constant speed. In other embodiments, the driving unit can be replaced by an engine or other brakes.

According to the embodiment of the present disclosure, the second transmission assembly for transferring the lead curtains 12 between the standby area 155 and the working area 156 can drive the lead curtains 12 in the standby area to fall into the starting point 101 of the conveying channel 10 in sequence or can push the lead curtains 12 from the starting point of the standby area 155 to the interior of the standby area 155. The second transmission assembly comprises second conveyor belts 14 and 14', which are symmetrically arranged on the respective sides of the supporting assembly 16 through three drive wheels 147 respectively. The second conveyor belts 14 and 14' are configured to be racetrack-shaped conveyor belts due to the arrangement of the drive wheels 147. That is, there is provided a drive wheel 147 at each of the respective ends of the second conveyor belts 14 and 14', and the other drive wheel 147 in the middle plays a tensioning role. A plurality of second stops 141-146 are respectively arranged on the second conveyor belts 14 and 14' along their respective circumferences. The second stops 141-146 are a plurality of projections, which are uniformly distributed on the second conveyor belts 14 and 14' and divide the second conveyor belts 14 and 14' into a plurality of storage segments for storing the lead curtains 12. The number of the second stops 141-146 can correspond to the number of the lead curtains 12 that can be stored in the standby area 155. That is, the number of the second stops 141-146 is determined by the number of the lead curtains 12 that can be stored in the standby area 155. For example, a corresponding relation of the number of the second stops and the number of the lead curtains 12 that can be stored in the standby area 155 can be 2N+2, wherein N represents the number of the lead curtains 12 that can be stored in the standby area 155. For example, as shown in FIG. 3 and FIG. 4, when the number of the lead curtains 12 that need to be stored in the standby area 155 is 2, the number of the second stops that are uniformly distributed is 6, and thus the 6 stops can uniformly divide the second conveyor belts 14 and 14' into 6 storage segments. Accordingly, in an intermittent movement of the second conveyor belts 14 and 14', it can be guaranteed that the upper part of the annular slot at least has two storage segments to store the lead curtains. Furthermore, the corresponding relation of the number of the second stops 141-146 and the number of the lead curtains 12 that can be stored in the standby area 155 can also be that the number of the second stops 141-146 is greater than the number of the lead curtains 12 that can be stored in the standby area 155, as long as it can be guaranteed that the lead curtains 12 in the standby area 155 can be respectively stored in the intervals between each two adjacent second stops 141-146.

In the aforementioned embodiment, the second transmission assembly is illustrated as the conveyor belt. However, according to actual needs, the second transmission assembly can also adopt chain transmission, rope transmission (e.g., a steel wire rope), or other linkage assemblies that can transfer the lead curtains.

In order that the second conveyor belts 14 and 14' on the respective sides of the supporting assembly 16 form a second transmission assembly that can drive the lead curtains 12 thereon to complete the upper travel in the standby area 155, the lead curtain protective device 1 further comprises the second driving unit 18, by which the second conveyor belts 14 and 14' can intermittently rotate around the drive wheels 147 arranged on the supporting assembly 16. When the second driving unit 18 drives the second conveyor belts 14 and 14' to rotate once, each of the second stops 141-146 can move forward by an interval between any two adjacent stops. Referring to FIG. 5, the second driving unit 18 comprises a motor 181, a speed reducer 182 and synchronous belts 183 and 184, which are connected in the above sequence (as shown in FIG. 2). The second conveyor belt 14' transfers a driving force to the second conveyor belt 14 by a transmission shaft 17' (as shown in FIG. 2) and the synchronous belt 184, wherein the transmission shaft 17' is connected between a pair of oppositely arranged drive wheels 147. Moreover, the movement of the second conveyor belts 14 and 14' is intermittent (i.e., triggered by the second driving unit 18 as required). Accordingly, referring to FIG. 3 and FIG. 1, when the second conveyor belts 14 and 14' are triggered by the second driving unit 18, the second stops 141-146 can drive the lead curtains 12 to move a distance clockwise, wherein the distance is determined by the interval between two adjacent second stops 141-146. Then, the lead curtain 12 between the second stops 141 and 146 in the standby area 155 is pushed to the fourth position 154. Since the original second stop 141 moves to the position of the original second stop 142 after being triggered, the lead curtain 12 at the fourth position 154 is not restrained by any of the second stops 141-146, the lead curtain can drop to the first position 151 by free fall and quickly arrive at the starting point 101 of the conveying channel 10. Accordingly, the lead curtain can be placed behind the article to be detected 2 on the belt conveyor 11 to prevent the rays in the conveying channel 10 from spreading out. In another aspect, the lead curtain 12 pushed to the starting point of the standby area 155 (i.e., at the third position 153) by the first conveyor belts 13 and 13' is further pushed to a position between the second stops 145 and 146 in the standby area 155 by the intermittent movement of the second conveyor belts 14 and 14' so as to be in a standby state. The interval between two adjacent second stops 141-146 is related to the distance from the third position 153 to the fourth position 154 and the number of the lead curtains that can be stored in the standby area 155. If the distance from the third position 153 to the fourth position 154 is constant, the larger the number of the lead curtains that can be stored in the standby area 155, the smaller the interval between the second stop 141 and the second stop 146 is. Moreover, the interval between the adjacent second stops 141-146 should be set in such a way that when the second transmission assembly is moved once, the lead curtain 12 between the second stop 141 and the second stop 146 of the standby area 155 can be released at the fourth position 154 and then can move to the first position 151 by free fall.

Furthermore, the arrangement and structures of the first conveyor belts and the second conveyor belts are not limited to the above, as long as they can engage with and drive the lead curtains 12 to complete the entire travel in the guide assemblies. Moreover, the first conveyor belts and the second conveyor belts can also be respectively arranged on the supporting assembly 16 through more or less drive wheels or other structures. The main body of the first conveyor belts and the second conveyor belts can also be not formed as belts, and chains, other rope structures and the like can also be adopted to drive the lead curtains 12 to move.

Furthermore, the structures of the first stops and the second stops are not limited to the above, as long as the lead curtains 12 can be driven to move along the motion trajectories defined by the guide assemblies 15 and 15'. In other embodiments, the first stops and the second stops can also be other structures having blocking functions, or can also be indentation structures and other structures that are formed in the first conveyor belts or the second conveyor belts and can push the connection parts of the lead curtains 12.

According to the embodiment of the present disclosure, the lead curtain protective device 1 further comprises detecting assemblies for providing the aforementioned detection functions. The detecting assemblies can detect (monitor) the relative position of and the conveying channel 10 and the article to be detected 2 entering the conveying channel 10, the relative position between two articles to be detected 2 in the conveying channel 10 and the distribution condition of the lead curtains 12 in the lead curtain protective device 1 to provide information assistance and feedback for the normal operation of the entire device. The lead curtain protective device 1 can adaptively adjust and control the intermittent movement of the second conveyor belts 14 and 14' according to the real-time detection and feedback data of the detecting assemblies. Accordingly, the lead curtain protective device 1 of the present disclosure can adaptively adjust the distances between the lead curtains according to the distribution condition of the articles to be detected on the belt conveyor, and thus a good shielding effect can be maintained without affecting the detection efficiency.

According to the embodiment of the present disclosure, the detecting assemblies comprise a first detecting assembly and a second detecting assembly. The first detecting assembly is adapted to detect a relative position relation of the article to be detected and the conveying channel. For example, the first detecting assembly comprise a plurality of photoelectric switches, which are uniformly distributed on the entire conveying channel along the movement direction of the article to be detected and are specifically used for sensing the relative position relation between articles to be detected and the relative position relation of the article to be detected and the conveying channel in real time. The denser the distribution of the first detecting assembly is, the more realistically the relative position between the articles to be detected or the relative position between the article to be detected and the conveying channel can be detected.

The second detecting assembly is adapted to detect the moving states and the distribution conditions of the lead curtains. For example, the second detecting assembly also comprises a plurality of photoelectric switches, which are uniformly distributed along the annular slots of the guide assemblies and are used for sensing the moving states and the distribution conditions of the lead curtains in real time. Similarly, the denser the distribution of the second detecting assembly is, the more realistically the moving states and the actual distribution conditions of the lead curtains can be detected.

The detecting assemblies in the aforementioned embodiment are exemplarily shown as photoelectric switches. However, the detecting assemblies can also adopt other sensors or the like, such as video monitors, for monitoring the positions and the distribution conditions of the articles to be detected or the lead curtains in real time. Furthermore, the detecting assemblies can also be cancelled when observation holes are provided for manual observation.

The above triggering of the intermittent movement of the second transmission assembly by the second driving unit 18 comprises three cases, which are specifically as follows.

First case indicates a case when the article to be detected completely enters the conveying channel.

Figure 6A:
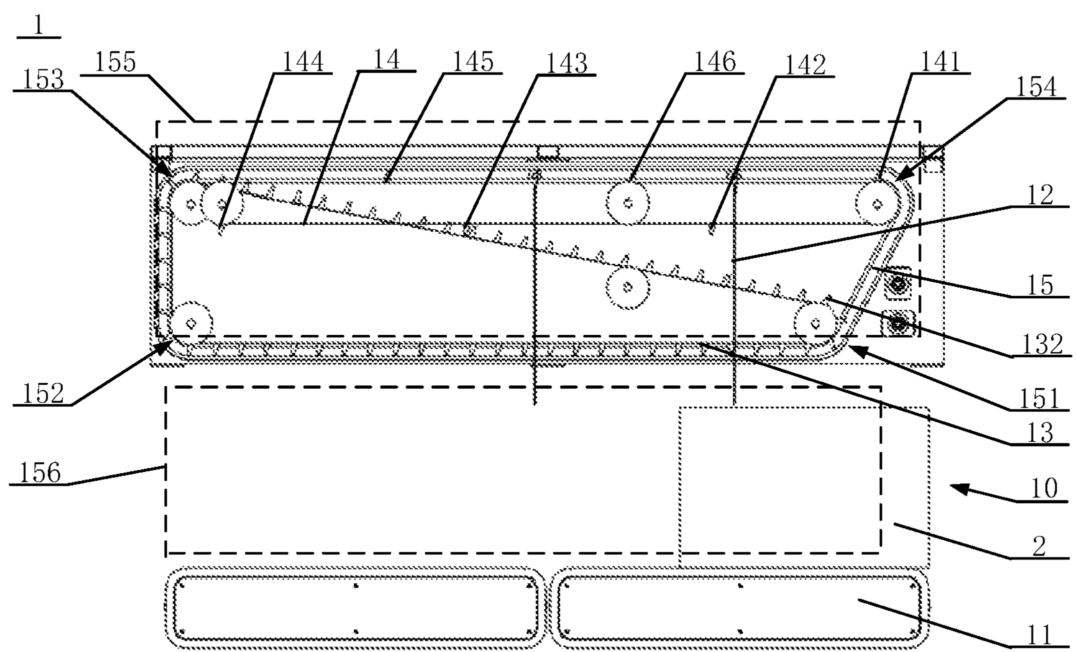
FIG. 6A and FIG. 6B show states in which an intermittent movement of the second transmission assembly is triggered in a first case according to an embodiment of the present disclosure.
Figure 6B:
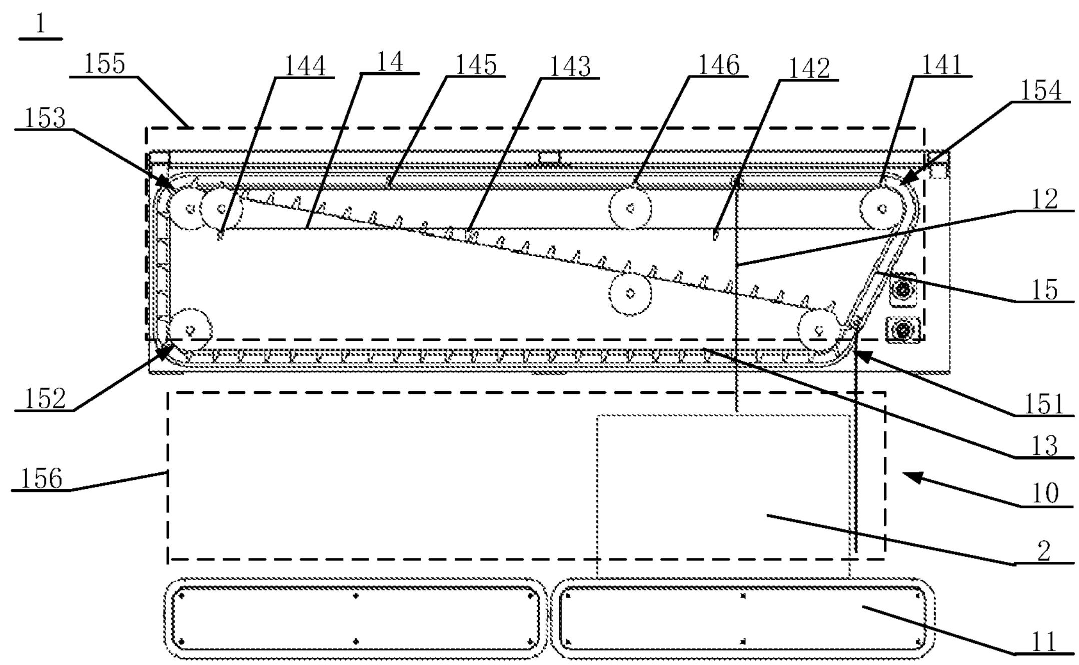

Please refer to FIG. 6A and FIG. 6B, which show the states in which the intermittent movement of the second transmission assembly is triggered in the first case according to the embodiment of the present disclosure. As shown in FIG. 6A, when the detecting assemblies of the lead curtain protective device 1 detect there is a space behind the article to be detected 2 at the starting point of the conveying channel 10 (i.e., detecting that the article to be detected 2 completely enters the conveying channel 10), the intermittent movement of the second conveyor belts 14 and 14' is triggered. In this case, the lead curtain 12 between the second stop 141 and the second stop 146 in the standby area 155 as shown in FIG. 6A will be pushed to the fourth position 154 and then drop at the fourth position 154 into the space behind the article to be detected 2 at the starting point by free fall (as shown in FIG. 6B), so as to play a good shielding role.

Second case indicates a case when there is only one lead curtain in the conveying channel and the lead curtain has moved to the ending point of the conveying channel.

Figure 7A:
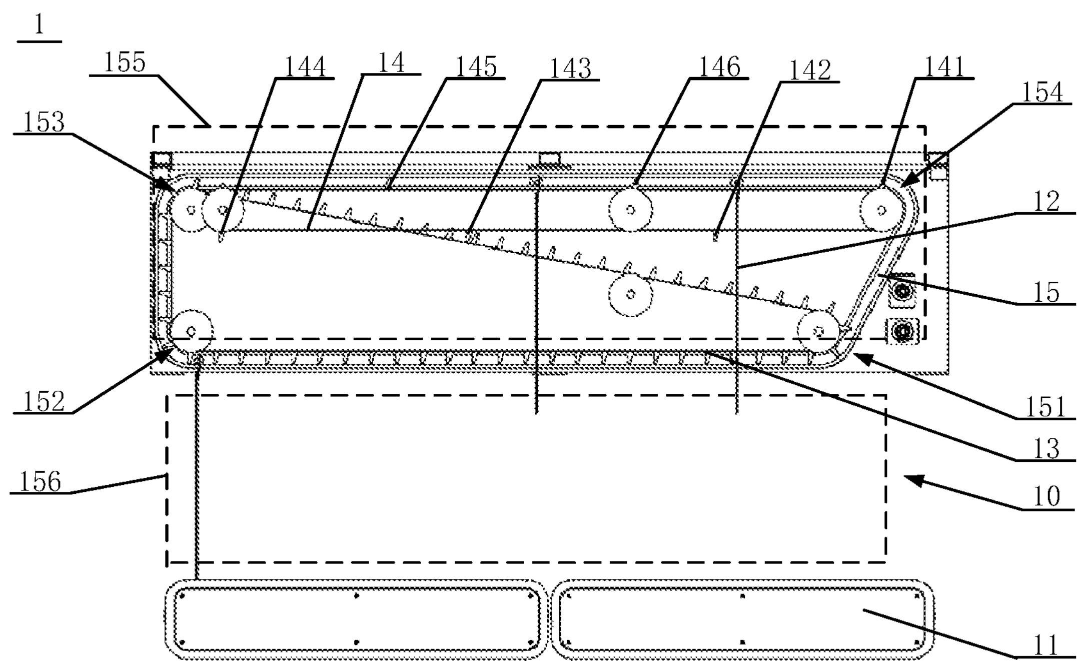
FIG. 7A and FIG. 7B show states in which an intermittent movement of the second transmission assembly is triggered in a second case according to an embodiment of the present disclosure.
Figure 7B:
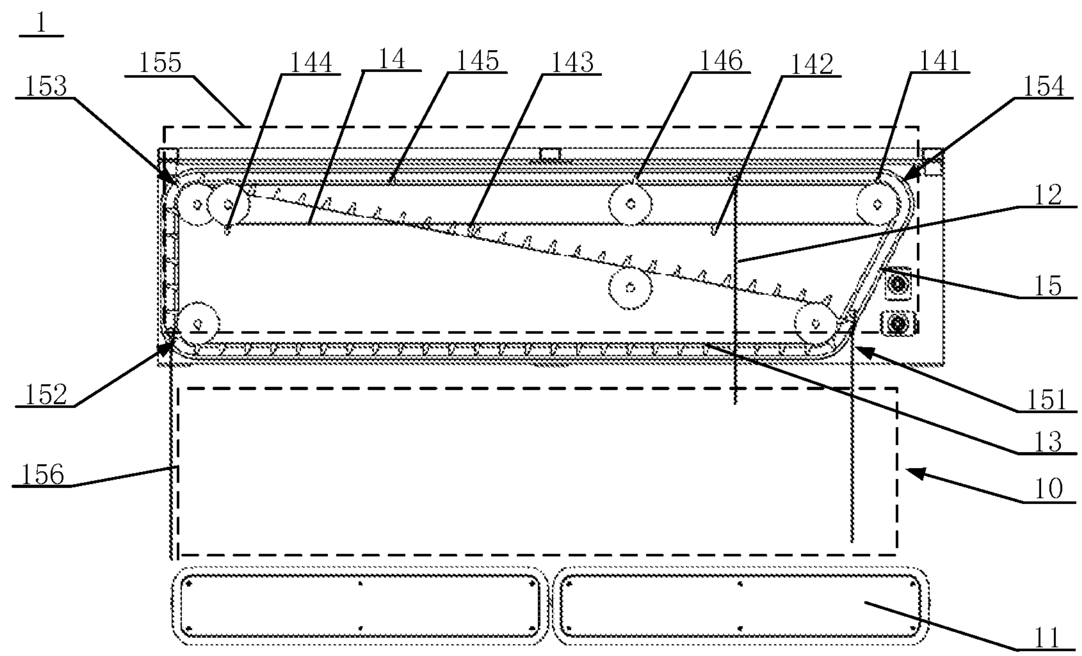

Please refer to FIG. 7A and FIG. 7B, which show the states in which the intermittent movement of the second transmission assembly is triggered in the second case according to the embodiment of the present disclosure. When the only lead curtain 12 in the conveying channel 10 has moved to the second position 152 (i.e., the lead curtain 12 is about to be taken away from the conveying channel 10) (as shown in FIG. 7A), the second driving unit 18 triggers the intermittent movement of the second conveyor belts 14 and 14' in order to continuously shield the rays in the conveying channel 10 by the lead curtains 12. In this case, the lead curtain 12 between the second stop 141 and the second stop 146 in the standby area 155 as shown in FIG. 7A will be pushed to the fourth position 154 and then drop into the conveying channel 10 by free fall (as shown in FIG. 7B), so as to play a good shielding role.

Third case indicates a case when any of the lead curtains moves to the ending point of the conveying channel and is about to enter the standby area from the working area.

Figure 8A:
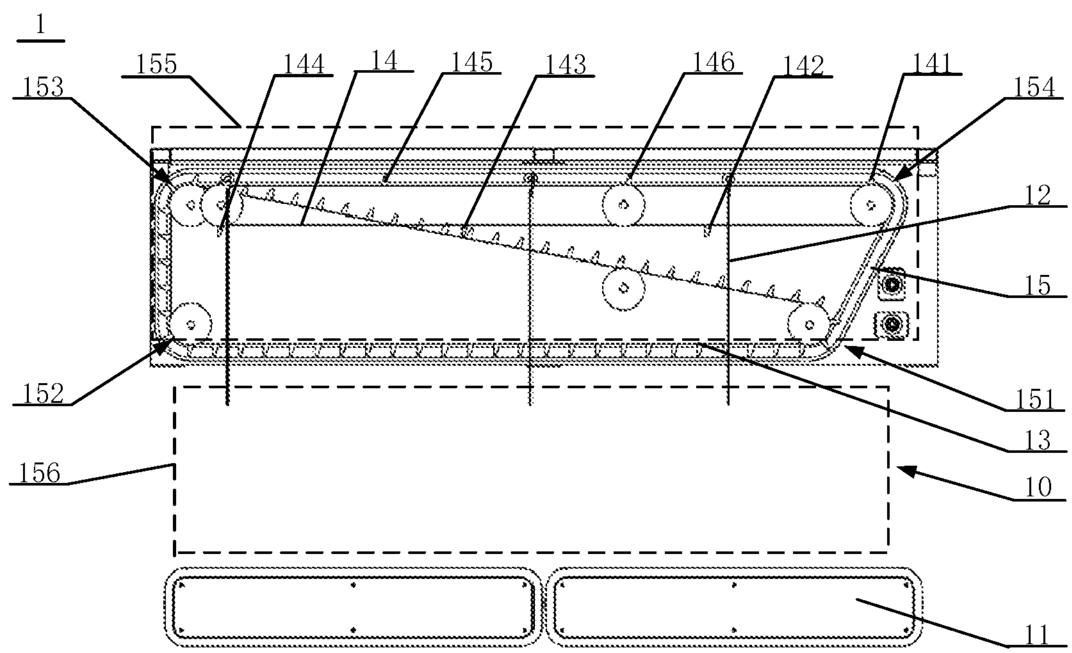
FIG. 8A and FIG. 8B show states in which an intermittent movement of the second transmission assembly is triggered in a third case according to an embodiment of the present disclosure.
Figure 8B:
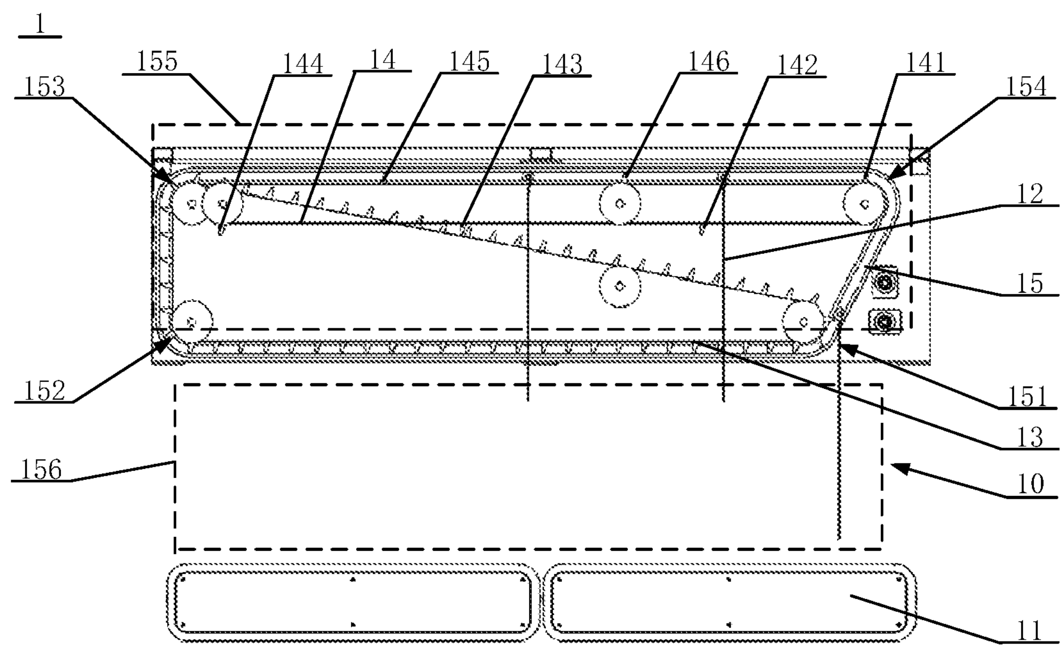

Please refer to FIG. 8A and FIG. 8B, which show the states in which the intermittent movement of the second transmission assembly is triggered in the third case according to the embodiment of the present disclosure. When the lead curtain 12 is moved by the second conveyor belts 14 and 14' to the third position 153 along the transition edge from bottom to top (as shown in FIG. 8A), in order that the lead curtain 12 can be easily pushed into the standby area 155, the second driving unit 18 will trigger the intermittent movement of the second conveyor belts 14 and 14', so that the lead curtain 12 is pushed to a position between the second stop 145 and the second stop 146 in the standby area 155 from the starting point of the standby area and is in a standby state (as shown in FIG. 8B). Prior to the triggering, if there is a lead curtain 12 in the standby state between the second stop 141 and the second stop 146 in the standby area 155, the lead curtain 12 will be pushed to the fourth position 154 and is released by free fall to enter the conveying channel 10.

The embodiment of the present disclosure further provides a ray shielding method by using the aforementioned lead curtain protective device 1. The ray shielding method by using the lead curtains according to the embodiment of the present disclosure will be illustrated below with the lead curtain protective device 1 as shown in FIG. 1 to FIG. 9 as an example. The method comprises the following steps: transferring the lead curtain 12 from the standby area 155 to the working area 156, so that the lead curtain falls into the starting point 101 of the conveying channel 10 and is located behind the article to be detected 2; driving the lead curtain 12 falling into the conveying channel 10 to synchronously move with the article to be detected 2 in front, and driving the lead curtain 12 to move from the starting point 101 of the conveying channel 10 to the starting point of the standby area 155; and transferring the lead curtain 12 arriving at the starting point of the standby area 155 from the working area to the standby area, so that the lead curtain is in a standby state.

According to the embodiment of the present disclosure, the ray shielding method by using the lead curtains further comprises: detecting the relative position of the article to be detected and the conveying channel to control the time of transferring the lead curtain between the standby area and the working area. The means for detecting the position of the article to be detected or the relative position of the article to be detected and the conveying channel can comprise: mounting infrared monitoring device, position sensors, video monitoring device or other detecting devices in the lead curtain protective device to detect the moving states, the distribution conditions and the like of the moving components. Specifically, a detecting assembly (not shown) can be arranged in the embodiment shown in the figure, the detecting assembly can detect (monitor) the relative position of the conveying channel 10 and the article to be detected 2 entering the conveying channel 10, the relative position between two articles to be detected 2 in the conveying channel 10 and the distribution condition of the lead curtains 12 in the lead curtain protective device 1 to provide information assistance and feedback for the normal operation of the entire device, so that the lead curtain protective device 1 can adaptively adjust and control the intermittent movement of the second conveyor belts 14 and 14' according to the detection and feedback data of the detecting assembly. Then, the lead curtain protective device 1 of the present disclosure can adaptively adjust the distribution of the lead curtains 12 according to the distribution condition of the articles to be detected 2, and thus a good shielding effect can be maintained without affecting the detection efficiency.

According to the embodiment of the present disclosure, the ray shielding method by using the lead curtains further comprises: transferring the lead curtain in the standby area to the working area according to the moving states of the lead curtains in the working area and the standby area and the distribution conditions of the articles to be detected in the conveying channel. Specifically, the lead curtain in the standby area is transferred to the working area in at least one of the following cases: the article to be detected completely enters the conveying channel; and only one lead curtain is located in the conveying channel and has arrived at the ending point of the conveying channel.

In one example, FIG. 6A and FIG. 6B show the state in which the intermittent movement of the second transmission assembly is triggered in the first case according to the embodiment of the present disclosure. In this case, when the detecting assembly of the lead curtain protective device 1 detects that there is an article to be detected on the belt conveyor at the starting point of the conveying channel and the article to be detected completely enters the conveying channel 10 (the case in which there is a space between two articles to be detected that are successively placed on the belt conveyor is also applicable), the intermittent movement of the second conveyor belts 14 and 14' is triggered. That is, the lead curtain 12 between the second stop 141 and the second stop 146 in the standby area as shown in FIG. 6A will be pushed to the fourth position 154 as shown in FIG. 6B and drop into a position behind the article to be detected 2 at the starting point (or into the space between the two articles to be detected) by free fall so as to play a good shielding role.

In another example, FIG. 7A and FIG. 7B show the states in which the intermittent movement of the second transmission assembly is triggered in the second case according to the embodiment of the present disclosure. In this case, when the only lead curtain 12 in the conveying channel 10 has moved to the second position 152 (as shown in FIG. 7A) (i.e., the lead curtain 12 is about to be taken away from the conveying channel 10 (i.e., leaving the working area 155)), the second driving unit 18 triggers the intermittent movement of the second conveyor belts 14 and 14' in order to continuously shield the rays in the conveying channel 10 by the lead curtains 12. Then, the lead curtain 12 between the second stop 141 and the second stop 146 in the standby area as shown in FIG. 7A will be pushed to the fourth position 154 and drop to the first position 151 (as shown in FIG. 7B) by free fall. Accordingly, the lead curtain 12 is at the starting point 101 of the conveying channel 10, so as to play a good shielding role.

FIG. 8A and FIG. 8B show the states in which the intermittent movement of the second transmission assembly is triggered in the third case according to the embodiment of the present disclosure. In this case, when the lead curtain 12 is moved by the second conveyor belts 14 and 14' to the third position 153 from bottom to top (i.e., when the lead curtain is at the starting point of the standby area 155 (as show in FIG. 8A)), in order that the lead curtain 12 can be easily pushed to be between the second stop 141 and the second stop 146, the second driving unit 18 will trigger the intermittent movement of the second conveyor belts 14 and 14', so that the lead curtain 12 is pushed to a position between the second stop 145 and the second stop 146 and is in a standby state (as shown in FIG. 8B). Prior to the triggering, if there is a lead curtain 12 in the standby state is located between the second stop 141 and the second stop 146, the lead curtain 12 will be pushed and released into the conveying channel 10.

According to the embodiment of the present disclosure, in order to guarantee that there is a certain interval between each two adjacent lead curtains 12 to prevent a dense arrangement of 5 lead curtains 12 (which may cause that: the last lead curtain 12 in the working area has moved to the second position 152 while the forefront lead curtain 12 in the working area has not moved to the third position 153, thus the rays will spread out), the ray shielding method by using the lead curtains further comprises: stopping transferring the lead curtain in the standby area to the working area according to the moving states of the lead curtains in the working area and the standby area and the distribution conditions of the articles to be detected in the conveying channel. Specifically, the transferring of the lead curtain in the standby area to the working area is stopped in at least one of the following cases: the number of the lead curtains in the conveying channel is greater than 2; or, the time from transferring a previous lead curtain from the standby area to the working area is less than a preset time interval.

In one example, when there are more than two lead curtains 12 in the conveying channel 10 (as shown in FIG.

3), the second driving unit 18 cannot trigger the intermittent movement of the second conveyor belts 14 and 14'. In this case, the transferring of the lead curtains 12 from the standby area 155 to the working area 156 is stopped. After any of the lead curtains 12 drops into the starting point 101 of the conveying channel 10 (as shown in FIG. 7B), the second driving unit 18 cannot trigger the intermittent movement of the second conveyor belts 14 and 14' within a preset stop-falling time (measured by the unit second). That is, the transferring of the lead curtains in the standby area to the working area is stopped.

According to the embodiment of the present disclosure, the ray shielding method by using the lead curtains further comprises: when one lead curtain is transferred from the standby area to the working area, driving a lead curtain behind the lead curtain in the standby area to move forward a distance. The distance is determined by the interval between two second stops and the rotating speed of the intermittent rotation of the second driving assembly. That is, the moving distance of the lead curtain in the standby area is determined by the moving distance of the second stop on the second transmission assembly when the second transmission assembly is triggered to move once. The moving distance of the second stop on the second conveyor belt for each triggering is determined according to the density of the stops on the second conveyor belt. Exemplarily, the moving distance of the second stop on the second conveyor belt after the second conveyor belt is triggered is set to be equal to the interval between two adjacent second stops. Alternatively, the moving distance can also be set according to other situations, as long as it can be guaranteed that when the second transmission assembly is triggered once, the lead curtains 12 at the second stop 141 and the second stop 146 in the standby area 155 can arrive at the fourth position 154 and can be transferred to the first position 151 by free fall. Specifically, according to the embodiment as shown in FIG. 7A and FIG. 7B, after the lead curtain 12 (as shown in FIG. 7A) between the second stop 141 and the second stop 146 is conveyed to the first position 151 (as shown in FIG. 7B), the lead curtain 12 (as shown in FIG. 7A) between the second stop 145 and the second stop 146 is driven to move to a position between the second stop 141 and the second stop 146 so as to be in the standby state (as shown in FIG. 7B). It is guaranteed that after the lead curtain 12 in the standby area 155 is transferred to the working area 156, there are lead curtains stored at positions in the standby area 155 close to the starting point, which can be easily driven by the intermittent movement of the second conveyor belts 14 and 14' and thus transferred to the working area 156. Accordingly, the distribution conditions of the lead curtains 12 can be adaptively adjusted to ensure a good shielding effect in the conveying channel 10.

According to the embodiment of the present disclosure, the ray shielding method by using the lead curtains further comprises: after the lead curtain in the standby area and close to the working area is moved once but cannot be transferred to the working area, driving the lead curtain to move forward for multiple times so as to transfer the same to the working area. Specifically, as shown in FIG. 6A, in the moving process of the lead curtain protective device 1, there may be a case in which one lead curtain 12 must be released to the starting point 101 of the lead curtain 10, but no lead curtain 12 in the standby area can be conveyed to the fourth position 154 and then released to the first position 151 by moving once (it is assumed that no lead curtain 12 is located between the second stop 141 and the second stop 146 in the figure). In this case, the second driving unit 18 needs to continuously trigger the intermittent movement of the second conveyor belts 14 and 14' for multiple times. That is, the second conveyor belts 14 and 14' drive the lead curtains 12 between other stops to move for multiple times until any lead curtain 12 is released to the first position 151.

Figure 9:
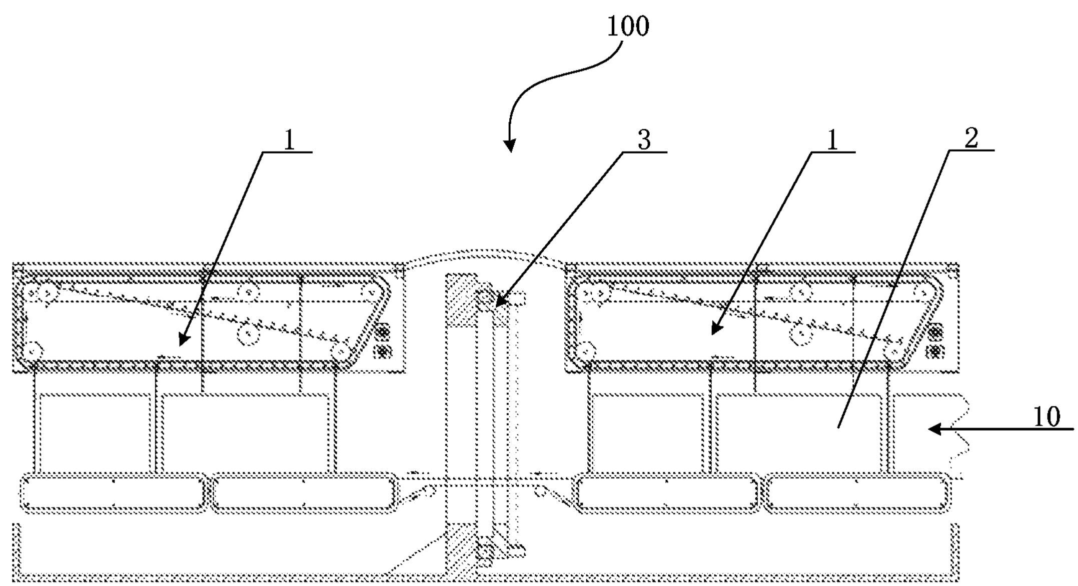
FIG. 9 shows a schematic diagram of an overall structure of a security detecting device according to an embodiment of the present disclosure.

According to the embodiment of the present disclosure, a security detecting device 100 provided with the aforementioned lead curtain protective device 1 is further exemplarily shown. FIG. 9 shows a schematic diagram of an overall structure of a security detecting device 100 according to the embodiment of the present disclosure. In the figure, the security detecting device 100 comprises two lead curtain protective devices 1 arranged on the respective ends, and a ray source device 3 mounted in the middle. That is, two lead curtain protective devices 1 and one ray source device 3 cooperate with each other to provide a complete conveying channel for the article to be detected 2. Since the security detecting device 100 according to the embodiment of the present disclosure has the lead curtain protective devices 1, it can also adaptively adjust the distribution of the lead curtains according to the distribution conditions of the articles to be detected on the belt conveyor, and thus a good shielding effect can be maintained without affecting the detection efficiency. The lead curtain protective device and the ray shielding method by using the lead curtains according to the embodiments of the present disclosure provide two transmission assemblies that cooperate with each other, such that the intervals between the lead curtains can be adaptively adjusted according to the distribution conditions of the articles to be detected on the belt conveyor, and thus the good shielding effect can be maintained without affecting the detection efficiency.

Although the present disclosure has been described with reference to the exemplary embodiments, it should be understood that the present disclosure is not limited to the constructions and methods in the aforementioned embodiments. On the contrary, the present disclosure is intended to cover various modifications and equivalent configurations. Furthermore, although various elements and method steps of the disclosed disclosure have been shown in various exemplary combinations and configurations, other combinations, including more or less elements or methods, are also within the scope of the present disclosure.

What is claimed is:

1. A lead curtain protective device for detecting device, comprising:

at least two lead curtains, for shielding X-rays in a conveying channel;

a supporting assembly, comprising a working area and a standby area, wherein the conveying channel is accommodated in the working area, and the standby area is adapted to store the lead curtains that are not used in the working area;

a first transmission assembly, for driving the lead curtains to move in the conveying channel; and a second transmission assembly, for transferring the lead curtains between the standby area and the working area, wherein the second transmission assembly is adapted to transfer the lead curtains from the standby area to the working area, so that the lead curtains fall into a starting point of the conveying channel and are located behind an article to be detected; the first transmission assembly is adapted to drive the lead curtains falling into the conveying channel to synchronously move with the article to be detected in front and drive the lead curtains to move from the starting point of the working area to a starting point of the standby area; and the second transmission assembly is further adapted to drive the lead curtains to enter the standby area and move in the standby area when the lead curtains arrive at the starting point of the standby area.

2. The lead curtain protective device of claim 1, further comprising a guide assembly arranged on the supporting assembly, wherein the guide assembly is adapted to guide motion trajectories of the lead curtains in the working area and the standby area.

3. The lead curtain protective device of claim 1, wherein the first transmission assembly comprises a first conveyor belt, first stops are arranged on the first conveyor belt along a circumference of the first conveyor belt, and the first conveyor belt is adapted to drive the lead curtains to move through the first stops.

4. The lead curtain protective device of claim 3, wherein the first transmission assembly further comprises a first driving unit for continuously driving the first conveyor belt to rotate at a constant speed.

5. The lead curtain protective device of claim 4, wherein the second transmission assembly comprises a second conveyor belt, second stops are arranged on the second conveyor belt along a circumference of the second conveyor belt, a number of the second stops corresponds to a number of the lead curtains that can be stored in the standby area, and the second conveyor belt is adapted to drive, through the second stops, the lead curtains to enter or leave the standby area or drive the lead curtains to move in the standby area.

6. The lead curtain protective device of claim 5, wherein the second transmission assembly further comprises a second driving unit for intermittently driving the second conveyor belt to rotate, and wherein when the second driving unit drives the second conveyor belt to rotate once, each second stop moves forward by an interval between any two adjacent stops.

7. The lead curtain protective device of claim 6, wherein the second driving unit is adapted to drive the second conveyor belt to rotate once in one of the following cases:

the article to be detected completely enters the conveying channel;

any of the lead curtains arrives at an ending point of the conveying channel and is about to enter the standby area from the working area; and only one lead curtain is located in the conveying channel, and has arrived at the ending point of the conveying channel.

8. The lead curtain protective device of claim 1, further comprising detecting assemblies, wherein the detecting assemblies comprise a first detecting assembly for detecting a relative position of the article to be detected and the conveying channel, and a second detecting assembly for detecting moving states and distribution conditions of the lead curtains.

9. An X-ray shielding method, comprising:

transferring, with a first transmission assembly, a lead curtain from a standby area to a working area, so that the lead curtain falls into a starting point of a conveying channel and is located behind an article to be detected;

driving, with a second transmission assembly, the lead curtain falling into the conveying channel to synchronously move with the article to be detected in front, and driving the lead curtain to move from the starting point of the conveying channel to a starting point of the standby area; and transferring, with the first transmission assembly, the lead curtain arriving at the starting point of the standby area into the standby area, and driving the lead curtain to move in the standby area.

10. The X-ray shielding method of claim 9, further comprising: detecting a relative position of the article to be detected and the conveying channel to control a time of transferring the lead curtain between the standby area and the working area.

11. The X-ray shielding method of claim 9, wherein the lead curtain in the standby area is transferred to the working area in at least one of the following cases:

the article to be detected completely enters the conveying channel; and only one lead curtain is located in the conveying channel, and has arrived at an ending point of the conveying channel.

12. The X-ray shielding method of claim 9, wherein the transferring of the lead curtain in the standby area to the working area is stopped in at least one of the following cases:

a number of lead curtains in the conveying channel is greater than 2; and a time from transferring a previous lead curtain from the standby area to the working area is less than a preset time interval.

13. The X-ray shielding method of claim 9, wherein whenever one lead curtain is transferred from the standby area to the working area, a lead curtain behind the lead curtain in the standby area moves forward by a distance.

14. The X-ray shielding method of claim 13, wherein after the lead curtain in the standby area and close to the working area is moved once but cannot be transferred to the working area, the lead curtain can be moved forward for multiple times so as to be transferred to the working area.

15. An X-ray shielding device, comprising:

means for transferring a lead curtain from a standby area to a working area, so that the lead curtain falls into a starting point of a conveying channel and is located behind an article to be detected;

means for driving the lead curtain falling into the conveying channel to synchronously move with the article to be detected in front, and driving the lead curtain to move from the starting point of the conveying channel to a starting point of the standby area; and means for transferring the lead curtain arriving at the starting point of the standby area into the standby area, and driving the lead curtain to move in the standby area.

16. The X-ray shielding device of claim 15, further comprising: means for detecting a relative position of the article to be detected and the conveying channel to control a time of transferring the lead curtain between the standby area and the working area.

17. The X-ray shielding device of claim 15, wherein the lead curtain in the standby area is transferred to the working area in at least one of the following cases:

the article to be detected completely enters the conveying channel; and only one lead curtain is located in the conveying channel, and has arrived at an ending point of the conveying channel.

18. The X-ray shielding device of claim 15, wherein the transferring of the lead curtain in the standby area to the working area is stopped in at least one of the following cases:

a number of lead curtains in the conveying channel is greater than 2; and a time from transferring a previous lead curtain from the standby area to the working area is less than a preset time interval.

19. The X-ray shielding device of claim 15, wherein whenever one lead curtain is transferred from the standby area to the working area, a lead curtain behind the lead curtain in the standby area moves forward by a distance.

20. The X-ray shielding device of claim 19, wherein after the lead curtain in the standby area and close to the working area is moved once but cannot be transferred to the working area, the lead curtain can be moved forward for multiple times so as to be transferred to the working area.

* * * * *